T. F. BAILY
Sept. 22, 1931. PROCESS OF MAKING PHOSPHORIC ACID AND CYANAMIDE Re. 18,198
Original Filed Feb. 5, 1929
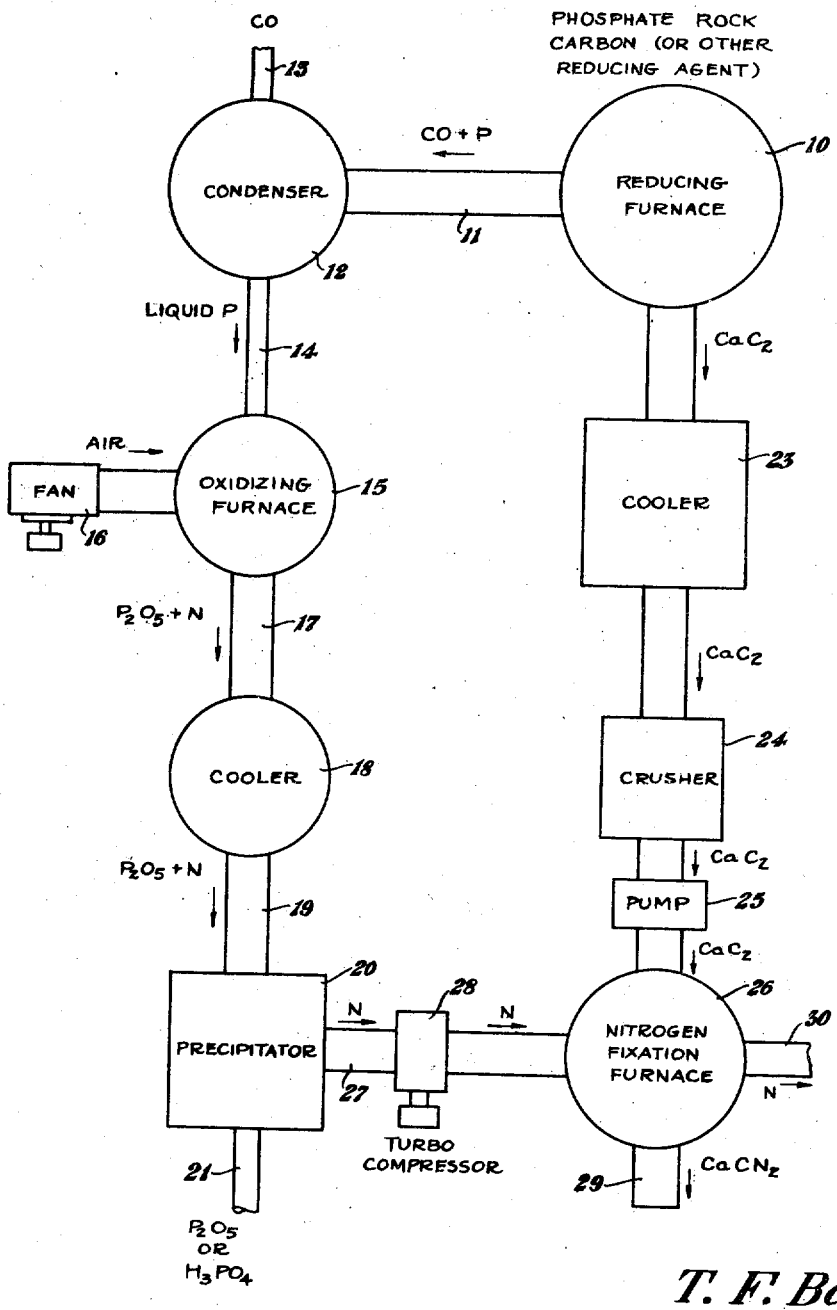
Inventor
T. F. Baily
By Harry Grease
Attorney Reissued Sept. 22, 1931 Re. 18,198

UNITED STATES PATENT OFFICE

THADDEUS F. BAILY, OF ALLIANCE, OHIO

PROCESS OF MAKING PHOSPHORIC ACID AND CYANAMIDE

Original No. 1,775,802, dated September 16, 1930, Serial No. 337,573, filed February 5, 1929. Application for reissue filed May 21, 1931. Serial No. 539,119.

The invention relates to the production of phosphoric acid and calcium cyanamide and more particularly to a combined electric furnace process of producing the phosphoric acid and cyanamide.

It is not known that anyone has ever made two fertilizer constituents, i. e. phosphoric acid and fixed nitrogen from phosphate rock as a raw material. All present operating processes for producing, by electric furnace method, phosphoric acid and cyanamide, do not include an inter-relation in producing these two constituents. In all electric furnace methods for producing phosphoric acid from phosphate rock silica is added to the calcium oxide left from the rock upon elimination of the phosphorus, and the resultant calcium silica slag, or calcium silicate, is worthless except for filling or road purposes; and all calcium cyanamide, produced by electric furnace process, is made from limestone, or lime, and carbon, and the nitrogen for nitriding the carbide is produced by the freezing of air.

The present invention contemplates the combined production of phosphoric acid and calcium cyanamide by reducing a charge of phosphate rock, in an electric furnace, in the presence of carbon, the phosphorus released by the reducing operation being recovered as phosphoric acid, the resultant slag from the phosphorus reducing operation being converted to calcium carbide, nitrogen being passed over the calcium carbide while maintained at a sufficient temperature to produce calcium cyanamide.

The object of the improvement is to provide a process and apparatus whereby a charge such as phosphate rock and a reducing agent such as coke may be placed in an electric furnace, the CO gas, or other carrier, and volatile phosphorus being withdrawn from the furnace and condensed, the CO gas being freed from the phosphorus which is liquefied in the condenser and passed to an oxidizing furnace to which air is admitted, preferably under pressure.

The phosphoric acid and nitrogen produced by this oxidizing process are then passed through a cooler and then to a precipitator in which the phosphoric acid is separated from the nitrogen and withdrawn.

The calcium slag resulting from the phosphorus reduction in the electric furnace is converted, while still in the furnace, into calcium carbide and may be flowed from the furnace to a cooler and then crushed and passed into a nitrogen fixation furnace.

The nitrogen that has been freed in the phosphorus oxidizing operation is admitted to this fixation furnace and passed over the crushed or ground calcium carbide at a red heat, forming calcium cyanamide.

In the drawing, the figure is a diagrammatic view of apparatus which may be used for carrying out the improved process.

Similar numerals refer to similar parts throughout the drawing.

An electric furnace of any suitable type is indicated generally at 10. For the purpose of the invention this furnace may be of 5,000 kw. capacity and may be charged with fine phosphate rock and coke breeze in substantially the proportions of one and one-half tons of phosphate rock to nine-tenths of a ton of coke breeze per hour.

The charge may be fed continuously into the furnace, in the proportions named, so as to maintain a constant temperature throughout the various zones of the furnace and to insure an even flow of phosphorus vapor and calcium carbide from the furnace. This also tends to keep the roof of the furnace sufficiently cool for operating purposes.

The carbon monoxide produced in the reduction of the charge in the furnace, amounting to about 1450 pounds of CO, in which about 400 pounds of reduced phosphorus in volatile form is entrained, is removed from the furnace through a duct 11 and carried to a condenser 12, preferably water cooled, where the phosphorus is condensed to a liquid, the carbon monoxide thus freed being removed through the pipe 13 and made available for any practical use, such as for heating or preheating the charge of raw material.

The liquid phosphorus is then conducted from the condenser through a duct 14 to an oxidizing furnace or water cooled oxidizing chamber 15 into which air is blown, as by a blower fan 16, at the rate of about 2700 pounds per hour, oxidizing the phosphorus to phosphoric acid ($P_2O_5$), robbing the air of its oxygen and freeing about 2200 pounds of nitrogen.

The phosphoric acid and nitrogen are then passed from the oxidizing chamber through a duct 17 to a cooler 18 and then through a duct 19 into a precipitator 20, which may be an electric precipitator.

The phosphoric acid ($P_2O_5$) is removed from the precipitator through the pipe 21 at the rate of about 913 pounds per hour or if desired in liquid form for convenient hauling and transportation in tank cars, water may be added, producing about 1260 pounds of ortho-phosphoric acid ($H_3PO_4$).

Simultaneous with the reduction and removal of the phosphorus from the furnace, the calcium slag resulting from the reduction is converted into calcium carbide ($CaC_2$) while still in the furnace.

This calcium carbide is flowed from the furnace at about the rate of 1238 pounds of contained $CaC_2$ per hour and is cooled by passing through a cooler or the like indicated at 23, after which it may be conveyed to a crusher indicated generally at 24 where it is finely crushed or ground.

A pump or the like as indicated at 25 may be provided for conveying the cooled and ground calcium carbide to a nitrogen fixation furnace 26. The nitrogen that has been freed from the air in the phosphorus oxidizing operation is passed from the precipitator through a duct 27, which may be provided with a turbo-compressor 28, into the furnace 26 and passed over the ground carbide at a red heat, forming calcium cyanamide ($CaCN_2$). About 2200 pounds of nitrogen per hour are passed into the furnace 26, producing about 1548 pounds of calcium cyanamide which may be removed through the discharge duct 29.

This cyanamide, after being removed from the furnace, may be cooled in the usual manner and prepared for shipment.

Since only about 542 pounds of nitrogen is used in the production of the calcium cyanamide, there is still available about 1718 pounds of nitrogen from the 2200 pounds produced by the phosphorus oxidization process and this nitrogen may be removed through the duct 30 and used for any nitrate products.

Since the calcium cyanamide is made entirely from the calcium slag resulting from the phosphorus reduction and the nitrogen feed from the air in the phosphorus oxidizing operation, it will be seen that the calcium cyanamide is produced entirely from waste materials from the phosphoric acid operation, thus materially reducing the cost of producing the phosphoric acid and the calcium cyanamide.

Although in the above description the amount of raw materials, as well as the production per hour of phosphoric acid and calcium cyanamide produced in a 5000 kw. furnace, is specified, it should be understood that these figures are only given for the purpose of illustration and that the amounts of raw material used and finished product produced per hour may vary considerably, depending upon the capacity of the furnace and other conditions.

I claim:

1. The combined process of producing phosphoric acid and calcium cyanamide which consists in reducing phosphate rock with a carbonaceous reducing agent, withdrawing CO gas and volatile phosphorus therefrom, condensing the volatile phosphorus and removing it from the CO, adding air to the condensed phosphorus producing phosphoric acid and nitrogen, and passing the nitrogen thus obtained over the calcium carbide resulting from the reducing operation, the calcium carbide being maintained at a sufficient temperature to produce calcium cyanamide.

2. The combined process of producing phosphoric acid and calcium cyanamide which consists in reducing phosphate rock with a carbonaceous reducing agent, withdrawing CO gas and volatile phosphorus therefrom, condensing the volatile phosphorus and removing it from the CO, adding air to the condensed phosphorus producing phosphoric acid and nitrogen, crushing the calcium carbide resulting from the reducing operation and passing the freed nitrogen over the calcium carbide, the calcium carbide being maintained at a sufficient temperature to produce calcium cyanamide.

3. The combined process of producing phosphoric acid and calcium cyanamide which consists in reducing phosphate rock with carbon, withdrawing CO gas and volatile phosphorus therefrom, condensing the volatile phosphorus and removing it from the CO, adding air to the condensed phosphorus producing phosphoric acid and nitrogen, crushing the calcium carbide resulting from the reducing operation, and reheating the calcium carbide in the presence of the nitrogen, producing calcium cyanamide.

4. The combined process of producing phosphoric acid and calcium cyanamide which consists in reducing phosphate rock with carbon, withdrawing CO gas and volatile phosphorus therefrom, condensing the volatile phosphorus and removing it from the CO, adding air to the condensed phosphorus producing phosphoric acid and nitrogen, cooling the calcium carbide resulting from the reducing operation, crushing the calcium carbide, and reheating the calcium carbide in the presence of the nitrogen, producing calcium cyanamide.

5. The combined process of producing phosphoric acid and calcium cyanamide which consists in reducing phosphate rock with carbon, withdrawing CO gas and volatile phosphorus therefrom, condensing the volatile phosphorus and removing it from the CO, adding air to the condensed phosphorus and cooling the same, producing phosphoric acid and nitrogen and passing the nitrogen thus obtained over the calcium carbide resulting from the reducing operation, the calcium carbide being maintained at a sufficient temperature to produce calcium cyanamide.

6. The combined process of producing phosphoric acid and calcium cyanamide which consists in reducing phosphate rock with carbon, withdrawing CO gas and volatile phosphorus therefrom, condensing the volatile phosphorus and removing it from the CO, adding air to the condensed phosphorus and cooling the same, producing phosphoric acid and nitrogen, crushing the calcium carbide resulting from the reducing operation and passing the freed nitrogen over the calcium carbide, the calcium carbide being maintained at a sufficient temperature to produce calcium cyanamide.

7. The combined process of producing phosphoric acid and calcium cyanamide which consists in reducing phosphate rock with carbon, withdrawing CO gas and volatile phosphorus therefrom, condensing the volatile phosphorus and removing it from the CO, adding air to the condensed phosphorus and cooling the same, producing phosphoric acid and nitrogen, crushing the calcium carbide resulting from the reducing operation, and reheating the calcium carbide in the presence of the nitrogen, producing calcium cyanamide.

8. The combined process of producing phosphoric acid and calcium cyanamide which consists in reducing phosphate rock with carbon, withdrawing CO gas and volatile phosphorus therefrom, condensing the volatile phosphorus and removing it from the CO, adding air to the condensed phosphorus and cooling the same, producing phosphoric acid and nitrogen, cooling the calcium carbide resulting from the reducing operation, crushing the calcium carbide, and reheating the calcium carbide in the presence of the nitrogen producing calcium cyanamide.

9. The combined process of producing phosphoric acid and calcium cyanamide which consists in reducing phosphate rock with carbon, withdrawing CO gas and volatile phosphorus therefrom, condensing the volatile phosphorus and removing it from the CO, oxidizing the condensed phosphorus with air, precipitating the same producing phosphoric acid and freeing the nitrogen and passing the nitrogen thus obtained over the calcium carbide resulting from the reducing operation, the calcium carbide being maintained at a sufficient temperature to produce calcium cyanamide.

10. The combined process of producing phosphoric acid and calcium cyanamide which consists in reducing phosphate rock with carbon, withdrawing CO gas and volatile phosphorus therefrom, condensing the volatile phosphorus and removing it from the CO, oxidizing the condensed phosphorus with air, precipitating the same producing phosphoric acid and freeing the nitrogen, crushing the calcium carbide resulting from the reducing operation and passing the freed nitrogen over the calcium carbide, the calcium carbide being maintained at a sufficient temperature to produce calcium cyanamide.

11. The combined process of producing phosphoric acid and calcium cyanamide which consists in reducing phosphate rock with carbon, withdrawing CO gas and volatile phosphorus therefrom, condensing the volatile phosphorus and removing it from the CO, oxidizing the condensed phosphorus with air, precipitating the same producing phosphoric acid and freeing the nitrogen, crushing the calcium carbide resulting from the reducing operation, and reheating the calcium carbide in the presence of the nitrogen, producing calcium cyanamide.

12. The combined process of producing phosphoric acid and calcium cyanamide which consists in reducing phosphate rock with carbon, withdrawing CO gas and volatile phosphorus therefrom, condensing the volatile phosphorus and removing it from the CO, oxidizing the condensed phosphorus with air, precipitating the same producing phosphoric acid and freeing the nitrogen, cooling the calcium carbide resulting from the reducing operation, crushing the calcium carbide, and reheating the calcium carbide in the presence of the nitrogen producing calcium cyanamide.

13. Apparatus for producing phosphoric acid and calcium cyanamide comprising a reducing furnace for reducing phosphate rock with carbon, a condenser communicating with the reducing furnace adapted to receive the CO gas and volatile phosphorus from the reducing furnace and to condense the phosphorus and remove the CO therefrom, an oxidizing furnace communicating with the condenser, means for admitting air to the oxidizing furnace producing phosphoric acid and nitrogen, a cooler communicating with the oxidizing furnace, a precipitator communicating with the cooler, means for cooling and crushing the calcium carbide from the reducing furnace, a fixation furnace adapted to receive the calcium carbide from the cooling and crushing means and means for passing the nitrogen from the precipitator into the fixation furnace producing calcium cyanamide.

14. Apparatus for producing phosphoric acid and calcium cyanamide comprising a reducing furnace for reducing phosphate rock with carbon, a condenser communicating with the reducing furnace adapted to receive the CO gas and volatile phosphorus from the reducing furnace and to condense the phosphorus and remove the CO therefrom, an oxidizing furnace communicating with the condenser, means for admitting air to the oxidizing furnace producing phosphoric acid and nitrogen, a cooler communicating with the oxidizing furnace, a precipitator communicating with the cooler for freeing the nitrogen from the phosphoric acid, a cooler for receiving the calcium carbide from the reducing furnace, a crusher for receiving the calcium carbide from the last named cooler, a fixation furnace adapted to receive the calcium carbide from the crusher and means for passing the freed nitrogen into the fixation furnace producing calcium cyanamide.

15. The combined process of producing phosphoric acid and a fixed nitrogen product which consists in reducing phosphate rock with carbon, withdrawing CO gas and volatile phosphorus therefrom, condensing the volatile phosphorus and removing it from the CO, adding air to the condensed phosphorus producing phosphoric acid and nitrogen, and passing the nitrogen thus obtained over the calcium carbide resulting from the reducing operation, the calcium carbide being maintained at a sufficient temperature to produce a fixed nitrogen product.

16. The process which consists in reducing phosphate rock with a carbonaceous agent, separating the phosphorus from the carrier, oxidizing the phosphorus with air, freeing the nitrogen and passing it over the calcium carbide produced from the slag of the phosphate rock while maintaining the calcium carbide at a high temperature.

17. The combined process of producing phosphoric acid and cyanamide which consists in reducing phosphate rock with a carbonaceous reducing agent, recovering phosphoric acid from the volatile gases produced in the reactions, and passing nitrogen over the calcium carbide, resulting from the reduction operation, at a suitable temperature for the production of calcium cyanamide.

18. The combined process of producing phosphoric acid and cyanamide which consists in reducing phosphate rock with a carbonaceous reducing agent, oxidizing the phosphorus produced in the reactions and separating it from the carrier gases and collecting it as phosphoric acid, converting the residue from the phosphorus reduction action to calcium carbide and passing nitrogen over the calcium carbide at a suitable temperature to produce calcium cyanamide.

19. The combined process of producing phosphoric acid and cyanamide which consists in heating phosphate rock in the presence of a carbonaceous reducing agent releasing the phosphorus in the form of a gaseous product, removing the phosphorus thus released and collecting it as phosphoric acid, converting the calcium residue from the phosphorus reduction into calcium carbide, and passing nitrogen over the calcium carbide thus produced at a suitable temperature to produce calcium cyanamide.

20. The combined process of producing phosphoric acid and cyanamide which consists in reducing phosphate rock with carbon, withdrawing the gaseous products of the reaction, oxidizing the phosphorus and separating it from the carrier gases and collecting it, and passing nitrogen over the calcium carbide resulting from the reduction operation at a suitable temperature to form calcium cyanamide.

THADDEUS F. BAILY.